(No Model.)
M. M. CONGER.
ROAD VEHICLE.
No. 388,763. Patented Aug. 28, 1888.
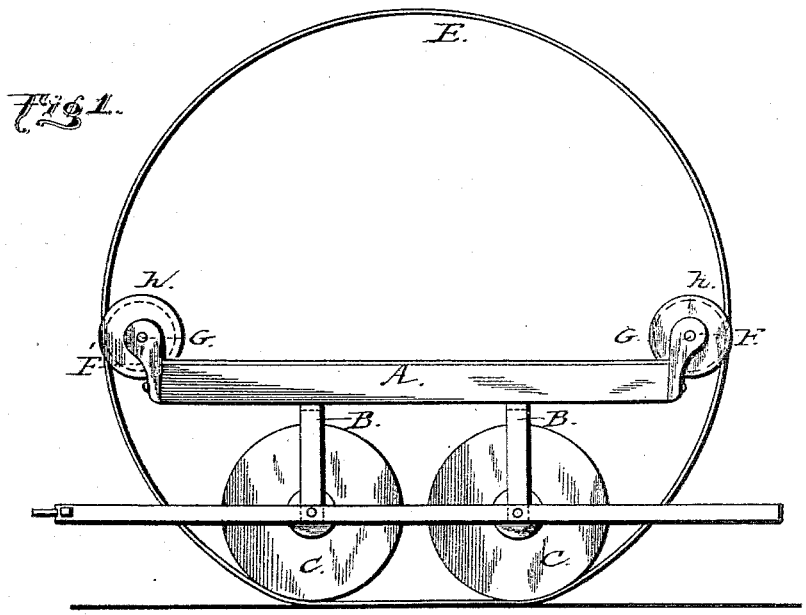
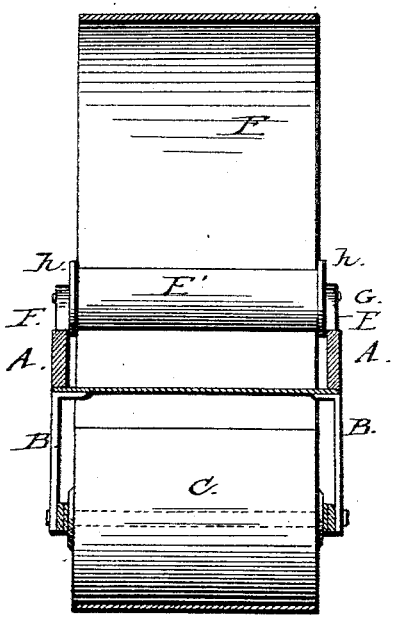
WITNESSES,
F. W. Howard,
N. A. Waller.
INVENTOR.
Milton M. Conger,
per Chas. W. Downs & Co.
Attorneys.

UNITED STATES PATENT OFFICE.

MILTON M. CONGER, OF LINNEUS, MISSOURI.

ROAD-VEHICLE.

SPECIFICATION forming part of Letters Patent No. 388,763, dated August 28, 1888.

Application filed June 5, 1888. Serial No. 276,073. (No model.)

*To all whom it may concern:*

Be it known that I, MILTON M. CONGER, a citizen of the United States, residing at Linneus, in the county of Linn and State of Missouri, have invented certain new and useful Improvements in Road-Vehicles; and I do hereby declare the following to be a full, clear, and exact description of the invention, such as will enable others skilled in the art to which it appertains to make and use the same.

My invention is an improvement in road-vehicles, and it relates particularly to a vehicle-body having two or more rollers serving the purpose of wheels, which bear not on the road directly, but upon the inner surface of a flexible cylinder, which flattens to the surface of the road over which it passes when borne upon by the weight of said vehicle as the latter is propelled forward.

The body of the vehicle in my device may be of ordinary form, supported upon a truck provided with axles and journal-bearings for the same, the former of which pass through the bearing-rollers. The axles may be fixed in the rollers and arranged to revolve in suitable bearings fixed in the truck, or the said axles may be fixed to the bearings of the truck and the rollers may revolve about them as axes. Either the truck or the superincumbent body is provided at four points, preferably at or near the angles of the same, with anti-friction rollers or wheels provided with flanges on their outer ends. The cylinder within which the rollers of the vehicle bear must have a diameter sufficient to contain the vehicle without cramping it, and the anti-friction rollers provided with the flanges must bear a certain relation to the rollers which take the weight of the body of the vehicle.

In my drawings, Figure 1 is a side elevation of my vehicle complete. Fig. 2 is a vertical section of the same.

Similar reference-letters indicate like parts in the figures.

Referring to the drawings, A is the body of the vehicle, supported upon the truck-bearings B.

C C are the rollers, through the axes of which pass the shafts, the ends of which bear in suitable journal-bearings formed in the truck-frame. In this instance it is proposed to have that portion of the shafts D which runs through the rollers square, and the ends of said shafts are to be cylindrical, to bear in the journal-boxes formed in the truck.

E is the bearing-cylinder for the road, formed of material that will readily yield to pressure or weight from within to change its form, and when relieved of the said weight to promptly right itself by its elastic energy.

F represents uprights extending from the body of the vehicle, and in these uprights are journaled shafts G, which pass through the body of the anti-friction rollers F'.

$h\ h$ are flanges formed on the ends of the rollers F. The width of the space between the flanges $h$ is exactly equal to the belt of the bearing-cylinder E, so that while the vehicle is moving and the rollers F' are bearing against the inner surface of the cylinder said vehicle is kept constantly in place within said cylinder by the flanges $h$, which serve the purpose of guides to keep the vehicle-body and the flexible cylinder in true lateral relation to each other.

The body of the vehicle, or the truck upon which it is indirectly supported, is intended to be connected to the propelling-power by suitable shafts or tongues, such as are used in ordinary vehicles; or the propelling-power may be mounted on the vehicle-body when steam or mechanical means is used for the motor.

In my improved vehicle it is my purpose to modify friction to the moving mass by keeping the wheels of the vehicle in an even plane which shall be so flexible as to yield to the weight brought upon it and form a constantly-changing surface, and be at the same time so broad as not to sink into a road on which it bears, even though said road be ever so soft.

Another purpose of my device is to save a road from the wear of ruts and cuts commonly formed in wet weather when heavy wheel-vehicles pass over the soft road-beds.

Having thus described my invention, what I claim as new, and desire to secure by Letters Patent, is—

1. The combination, with a vehicle provided with rollers serving the purpose of wheels, of an elastic cylinder serving as a flat bearing for said wheels as it bears upon an ordinary road, substantially as set forth.

2. The combination, with a wheel-vehicle and the elastic cylinder described, of anti-friction rollers provided with guide-flanges on their ends to bear against the edge of the said elastic cylinder, as and for the purpose set forth.

In testimony whereof I affix my signature in presence of two witnesses.

MILTON M. CONGER.

Witnesses:
D. B. ORMISTON,
B. J. NORTHCOTT.